United States Patent
Ray (10) Patent No.: US 9,322,685 B2
(45) Date of Patent: Apr. 26, 2016

(54) MEMS-BASED CONFORMAL AIR SPEED SENSOR

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 14/318,955

(22) Filed: Jun. 30, 2014

(65) Prior Publication Data

US 2015/0377662 A1    Dec. 31, 2015

(51) Int. Cl.
*G01F 1/38*    (2006.01)

(52) U.S. Cl.
CPC ....................... *G01F 1/383* (2013.01)

(58) Field of Classification Search
CPC ............... G01F 1/38; G01F 1/10; G01L 9/00; G01L 7/08
USPC .......................... 73/754, 715, 861.47, 170.07
See application file for complete search history.

(56) References Cited

U.S. PATENT DOCUMENTS

| | | | |
|---|---|---|---|
| 3,427,878 A | 2/1969 | Gerlitz, Jr. et al. | |
| 3,795,145 A | 3/1974 | Miller | |
| 6,101,429 A | 8/2000 | Sarma et al. | |
| 6,820,490 B2 * | 11/2004 | Mittelstein | G01L 9/0064 73/700 |
| 7,337,678 B2 | 3/2008 | Thakre et al. | |
| 7,508,040 B2 * | 3/2009 | Nikkel | G01L 9/0052 257/414 |
| 7,900,518 B2 * | 3/2011 | Tai | A61B 3/16 361/283.4 |
| 8,286,506 B2 | 10/2012 | Speldrich | |
| 2009/0199648 A1 * | 8/2009 | Sung | G01L 9/0098 73/754 |

FOREIGN PATENT DOCUMENTS

FR    2892813 A1    5/2007

OTHER PUBLICATIONS

Extended European Search Report, European Application No. 15174480.2 (European counterpart of the instant patent application), dated Sep. 24, 2015.
Chao Wei Si et al., "Design of a MEMS Resonant Wind Sensor on Airplane Wing", Key Engineering Materials, vol. 562-565, Jul. 15, 2013, pp. 436-440.
Eswaran et al., "Design Analysis of MEMS Capacitive Differential Pressure Sensor for Aircraft Altimeter," International Journal of Applied Physics and Mathematics, vol. 2, No. 1, Jan. 2012, pp. 14-20.

* cited by examiner

*Primary Examiner* — Jewel V Thompson
(74) *Attorney, Agent, or Firm* — Ostrager Chong Flaherty & Broitman P.C.

(57) ABSTRACT

Systems and methods for measuring air speed which solve the problem of icing or blockage by creating an exterior surface on an aircraft that channels air and measures the pressure difference of the pressure through the airflow and the static pressure. This exterior surface cannot be blocked easily because air is always flowing when the aircraft is in motion, any external matter that could be on the exterior surface is readily visible, and the exterior surface can be heated to prevent icing. In addition, the exterior surface is made of a flexible material that is able to conform closely to the exterior shape of the aircraft. The preferred embodiments comprise microelectromechanical system pressure sensors placed under the air channels for measuring the pressure difference in each channel and an air speed processor for transforming the pressure differences into an air speed estimate.

23 Claims, 9 Drawing Sheets

MEMS-BASED CONFORMAL AIR SPEED SENSOR

BACKGROUND

The present disclosure relates generally to sensors for measuring the speed of an aircraft relative to its surrounding air mass (hereinafter "air speed").

Aircraft require ownship air speed measurements in flight for aircraft handling, aerodynamics and potential stalling. This is usually done with a Pitot tube, which consists of a tube pointing directly into the air flow. Using internal fluid which is compressed under air pressure, the fluid pressure can be measured and used to compute the stagnation pressure of the air. To compute the air velocity, a comparison is made against the static pressure measured from static ports feeding a barometer. Then using Bernoulli's equation, the dynamic pressure (hence the air speed) can be computed.

Modern Pitot tubes are heated but still have problems with icing and blockage that make their usage problematic under certain conditions. More specifically, the Pitot tube can be blocked by external matter while the plane is grounded, the Pitot tube can still ice up even with heating, and the Pitot tube increases drag relative to a solution that is able to conform more closely to the exterior shape of the aircraft.

There is a need for an alternative methodology for measuring air speed that is not affected by icing or other blockage issues and that decreases drag.

SUMMARY

The subject matter disclosed herein is directed to systems and methods for measuring air speed which avoid the drawbacks of Pitot tubes. The systems disclosed in detail below solve the problem of icing or blockage of Pitot tubes by creating an exterior surface on an aircraft that channels air and measures the pressure difference of the pressure through the airflow and the static pressure. This exterior surface cannot be blocked easily as a tube can be since air is always flowing when the aircraft is in motion, any external matter that could be on the exterior surface is readily visible, and the exterior surface can be heated to prevent icing. In addition, the exterior surface is made of a flexible material that is able to conform more closely to the exterior shape of the aircraft.

In accordance with embodiments disclosed herein, the system comprises microelectromechanical system (MEMS) pressure sensors placed under the air channels for measuring the pressure difference in each channel and an air speed processor for transforming the pressure differences from the pressure sensors into an air speed estimate. This approach has the following advantages:

(1) The one or more MEMS pressure sensors installed under each air channel directly measure air pressure difference of air under flow and static pressure underneath a conformal surface.

(2) All external surfaces can be heated, reducing the possibility of ice build-up.

(3) A conformal surface can reduce drag as compared to an external Pitot tube.

(4) The air channels are not enclosed (as are Pitot tubes), thereby reducing the likelihood of blockage.

(5) The air channels always have air flow when the aircraft is in motion, further reducing the possibility of blockage.

(6) Any external matter or damage on the channeled surface is visible before take-off.

These provide benefits to any aerospace applications measuring air speed that has risks of icing or blockage.

One aspect of the subject matter disclosed in detail below is an apparatus comprising: a flexible structure having an exterior surface with an open air channel formed therein; and a pressure sensor installed in the flexible structure in a position underneath and in fluid communication the open air channel. The flexible structure comprises a static pressure input and a static pressure chamber in fluid communication with a static pressure input, the pressure sensor being in fluid communication with the static pressure chamber. In accordance with some embodiments, the pressure sensor is a capacitive differential pressure sensor comprising a microelectromechanical system. More specifically, the pressure sensor comprises a deformable diaphragm membrane having a first electrode formed thereon and a substrate having a second electrode formed thereon, the first and second electrodes being separated by a distance which is a function of a deflection of the deformable diaphragm membrane. The open air channel comprises a constricted portion, the pressure sensor being disposed underneath the constricted portion of the first open air channel.

In accordance with some embodiments, the apparatus further comprises a heating element which is thermally coupled to the exterior surface of the flexible structure. The exterior surface of the flexible structure can be made of metal or plastic. In cases where the exterior surface of the flexible structure is made of a non-thermally conductive material, such as plastic, the apparatus further comprises thermally conductive gel by which the heating element is thermally coupled to the exterior surface of the flexible structure.

In accordance with some embodiments, the exterior surface of the flexible structure has first and second open air channels formed therein, the apparatus further comprising first and second pressure sensors installed in the flexible structure in positions underneath and in fluid communication the first and second open air channels respectively. In these cases, the apparatus further comprises: a first signal conditioning circuit connected to condition an analog signal output by the first pressure sensor; a first analog-to-digital converter connected to convert a conditioned analog signal output by the first signal conditioning circuit into a first digital signal; a second signal conditioning circuit connected to condition an analog signal output by the second pressure sensor; a second analog-to-digital converter connected to convert a conditioned analog signal output by the second signal conditioning circuit into a second digital signal; and a processor programmed to calculate an air speed estimate taking into account the first and second digital signals.

Another aspect of the subject matter disclosed in detail below is a system comprising an airplane having an exterior surface and a conformal air speed sensor attached to the exterior surface of the airplane, wherein the conformal air speed sensor comprises: a flexible structure having an exterior surface with a first and second open air channels formed therein; a first capacitive differential pressure sensor installed in the flexible structure in a position underneath and in fluid communication the first open air channel; a second capacitive differential pressure sensor installed in the flexible structure in a position underneath and in fluid communication the second open air channel; and electronic circuitry which is programmed or configured to estimate an air speed of the aircraft based at least in part on signals output by the first and second capacitive differential pressure sensors. In some embodiments, the flexible structure comprises a static pressure input and first and second static pressure chambers in fluid communication with the static pressure input, the first pressure sensor being disposed between the first open air channel and the first static pressure chamber, and the second pressure sensor being disposed between the second open air channel and the second static pressure chamber. Each of the first and second open air channels comprises a respective constricted portion, the first capacitive differential pressure sensor being disposed underneath the constricted portion of the first open air channel and the second capacitive differential pressure sensor being disposed underneath the constricted portion of the second open air channel. In accordance with one implementation, the electronic circuitry comprises: a first signal conditioning circuit connected to condition an analog signal output by the first capacitive differential pressure sensor; a first analog-to-digital converter connected to convert a conditioned analog signal output by the first signal conditioning circuit into a first digital signal; a second signal conditioning circuit connected to condition an analog signal output by the second capacitive differential pressure sensor; a second analog-to-digital converter connected to convert a conditioned analog signal output by the second signal conditioning circuit into a second digital signal; and a processor programmed to calculate an air speed estimate taking into account the first and second digital signals.

A further aspect of the disclosed subject matter is a method of estimating a speed of a craft that is operable to move through a fluid medium, the method comprising: attaching a flexible structure on an exterior surface of the craft, the flexible structure having an exterior surface with one or more open air channels formed therein; transmitting signals from one or more differential pressure sensors installed underneath constricted portions of the one or more open air channels; and calculating the speed of the craft relative to a surrounding fluid medium during movement of the craft, which speed calculation is based on a density of the fluid medium and the signals transmitted by the one or more differential pressure sensors. Each signal transmitted by each differential pressure sensor represents a difference between a static pressure underneath a respective open air channel and a total pressure in the same open air channel. The method may further comprise conditioning analog signals transmitted by the differential pressure sensors and converting those analog signals to digital signals. In one implementation, the calculating step comprises: transforming the digital values into respective speed estimates based in part on the density of the fluid medium; calculating a mean speed estimate based on those speed estimates; and filtering out subsequent speed estimates which differ from the mean speed estimate by more than a specified threshold. In the disclosed embodiments, the fluid medium is air and the craft is an aircraft.

Other aspects of MEMS-based conformal air speed sensors are disclosed and claimed below.

BRIEF DESCRIPTION OF THE DRAWINGS

Reference will hereinafter be made to the drawings in which similar elements in different drawings bear the same reference numerals.

DETAILED DESCRIPTION

For the purpose of illustration, embodiments of a system and method for measuring air speed that utilize MEMS-based pressure sensors will now be disclosed in detail. However, alternative pressure sensors of suitable size and sensitivity, not fabricated using modified semiconductor device fabrication technologies, could be utilized.

In accordance with the embodiments disclosed herein, the system comprises an array of MEMS capacitive differential pressure sensors with their associated signal conditioning, and a partially flexible conformal surface structure with air channels and holes for MEMS capacitive differential pressure sensor input as well as static air intake. The system further comprises a processor that computes a final air speed estimate. Preferably, means for heating the conformal surface (to prevent icing of the air channel) are provided. If the conformal surface is made of metal or other thermally conductive material, the heating means may comprise resistive heating wires attached to the underside of the conformal surface. If the conformal surface is made of plastic or other non-thermally conductive material, the heating means may comprise heating elements (e.g., resistive heating wires) embedded within a thermally conductive gel that fills the space underlying the conformal surface and thermally couples the conformal surface to the heating elements. These components are described in more detail with reference to the drawings in the following sections.

1. MEMS Capacitive Differential Pressure Sensor Array

The system in accordance with preferred embodiments uses an array of MEMS capacitive differential pressure sensors to sense dynamic air pressure, which can be used to compute air speed based on the measured dynamic air pressure. This process can be done using the well-known Bernoulli's principle (sometimes called the Venturi effect), which can be used to calibrate any air speed indicator so that it displays the indicated air speed appropriate to the dynamic pressure.

Figure 1:
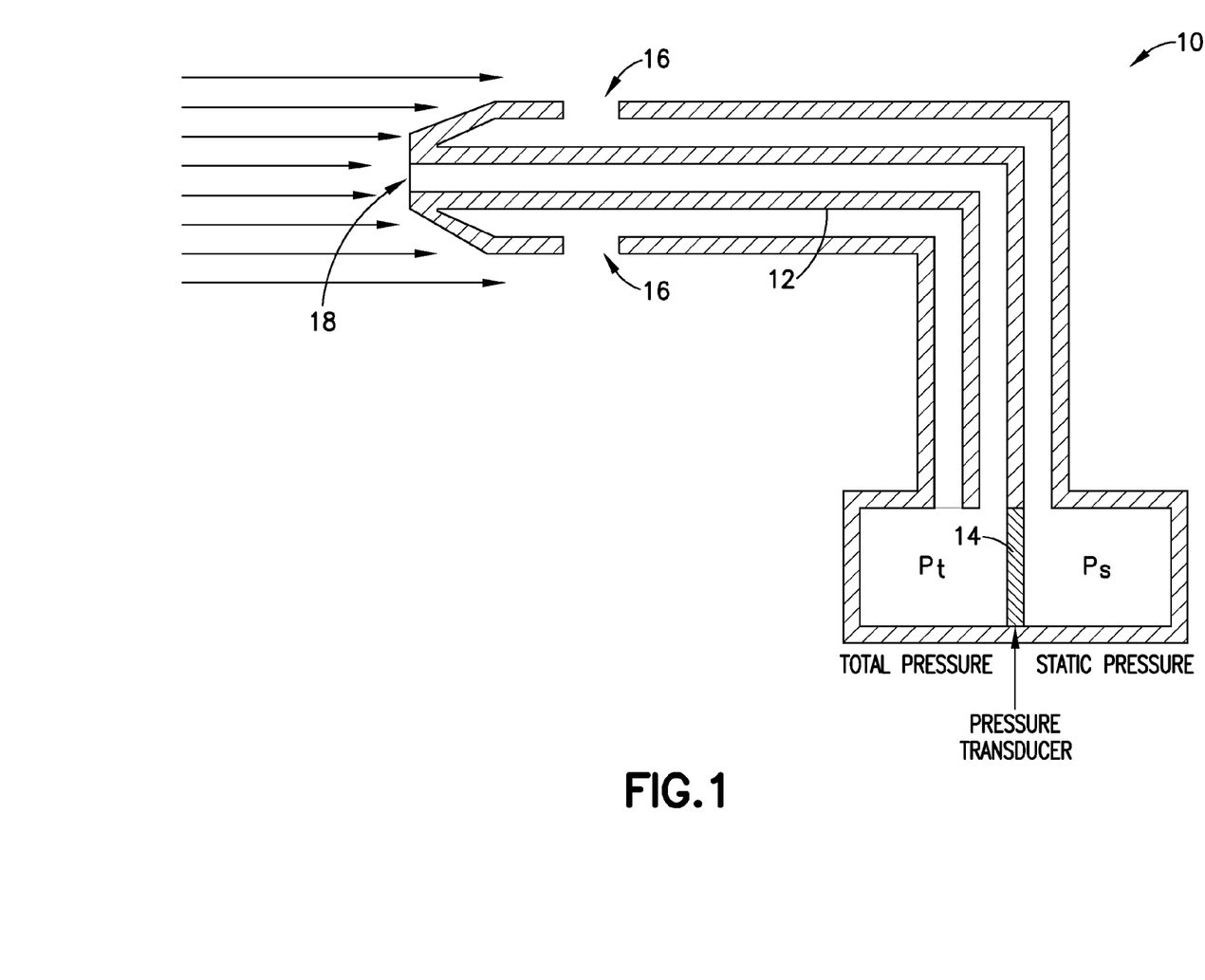
FIG. 1 is a diagram representing a sectional view of a typical Pitot tube air speed sensor.

The traditional means of air speed measurement uses a Pitot tube 10 which measures the dynamic pressure through use of a tube 12 pointed into the air flow and which measures the difference between the static pressure $P_s$ and total pressure $P_t$ through differently positioned air intakes 16 and 18, together with a fluid measurement using a pressure transducer 14 as shown in FIG. 1.

MEMS pressure transducers generate an electrical signal output that is in some way proportional to the applied pressure of a given medium. There are three main pressure measurement types: absolute, gage and differential pressure sensors. The application disclosed herein employs one or more differential pressure sensors, which will measure the difference between the outer air flow pressure in an air channel and the static pressure inside the conformal surface. The ability to detect small pressure changes makes MEMS differential pressure sensors ideal for applications which must translate small pressure differences into accurate air speed measurements.

There are also different technologies used for MEMS pressure sensors. The most common type of MEMS pressure sensor is based on piezoresistive technology, which implements a strain gage that experiences a change in resistivity when exposed to physical pressure stimuli, i.e., the strain force in an ion-implanted resistor over a diaphragm. Unfortunately, these sensors are inherently sensitive to temperature changes, making their use on aircraft problematic. The other common technology used is capacitive.

A capacitive differential pressure sensor measures changes in pressure by the deflection of a deformable conductive diaphragm due to the applied pressure. Typically a capacitive differential pressure sensor is based on two conductive electrodes with a small gap between them. One of the conductive electrodes is movable relative to the other in response to changing pressure differential. The electrical field (and capacitance) will change linearly as a function of the distance between the two electrodes. The smaller the gap, the higher the capacitance value until they touch and short-circuit the capacitor. Capacitive sensors are also insensitive to temperature effects, which is a great advantage over the piezoelectric versions. In accordance with the embodiments disclosed herein, MEMS capacitive differential pressure sensors are employed.

Figure 2:
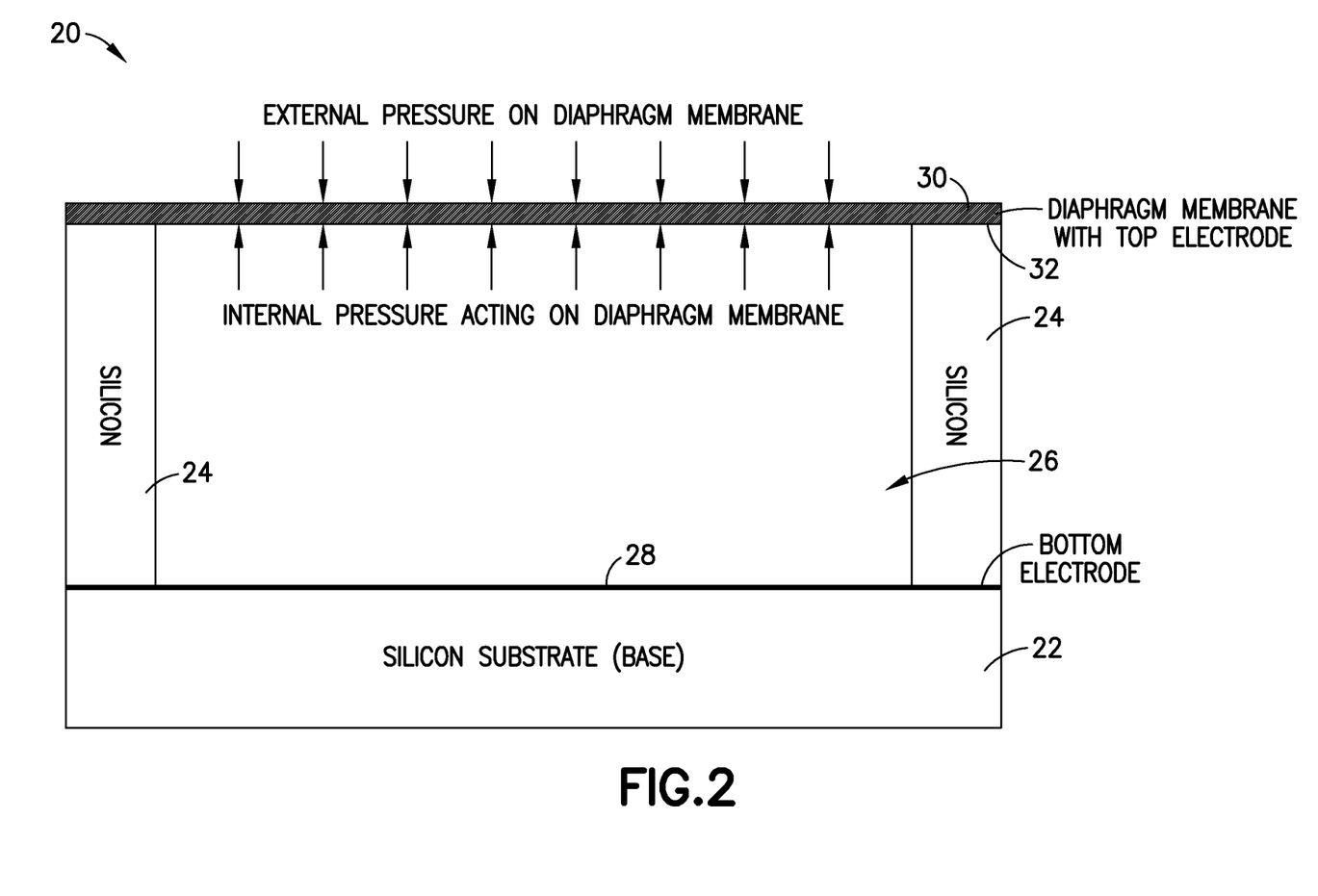
FIG. 2 is a diagram representing a sectional view of a capacitive differential MEMS pressure sensor which is suitable for use in a conformal air speed sensor. This MEMS pressure sensor has a diaphragm membrane which is shown in an undeformed state in FIG. 2.

A cross section of a MEMS capacitive differential pressure sensor 20 in accordance with one embodiment is shown in FIG. 2. This sensor comprises a silicon substrate (i.e., base) 22, a peripheral wall 24 which extends upward from the substrate 22, and a deformable diaphragm membrane 30 having a peripheral portion attached to the peripheral wall 24. The volume of space bounded by substrate 22, peripheral wall 24, and diaphragm membrane 30 forms a cavity 26 which, as explained in more detail below, will be occupied by air at a static pressure. The diaphragm membrane 30 is shown in an undeformed state, meaning that the internal and external pressures (indicated in FIG. 2 by respective sets of opposing arrows) acting on the opposites sides of the membrane are equal.

The MEMS capacitive differential pressure sensor 20 depicted in FIG. 2 further comprises a bottom electrode 28 formed on the upper surface of the substrate 22 and a top electrode 32 formed on the inner (i.e., lower as seen in FIG. 2) surface of the diaphragm membrane 30. Both electrodes are made of electrically conductive material. As will be described in more detail later with reference to FIG. 3B, during flight of the aircraft the outer (i.e., upper as seen in FIG. 2) surface of the diaphragm membrane 30 will be subjected to the external pressure being exerted by the air flow in the channel while the inner surface of the diaphragm membrane 30 will be subjected to the internal static pressure being exerted by the air in cavity 26, which air is in fluid communication with the static air within the body of the conformal surface (not shown in FIG. 2, but see static pressure chamber 36 in FIG. 3B).

For convenience, the operation of the MEMS capacitive differential pressure sensor 20 depicted in FIG. 2, during flight of the aircraft on which it is mounted, will be briefly described here. When the external pressure being exerted on the outer surface of diaphragm membrane 30 is greater than the internal pressure (i.e., the pressure inside cavity 26) being exerted on the inner surface of diaphragm membrane 30, the top electrode 32 deflects towards the bottom electrode 28 and the effective capacitance increases. The electrical field (and capacitance) will change linearly as a function of the distance between the two electrodes. The smaller the gap, the higher the capacitance value. The air speed can be estimated based in part on such changes in capacitance, which changes in capacitance are in turn a function of the pressure difference across the diaphragm membrane 30.

MEMS pressure sensors are calibrated by applying one pressure while capturing the raw data from the pressure sensor and an accurate measurement from a high-accuracy NIST (National Institute of Standards and Technology) calibrated reference sensor. This sequence is repeated for many pressure set points and the captured sensor data are then run through a compensation algorithm to determine a linear fit for the sensor output. Calibration coefficients, such as offset and gain, are calculated in this process. The air speed measuring system disclosed herein uses integrated devices in which these coefficients are stored in onboard non-volatile memory to very accurately report a measured pressure which has been fully compensated for external factors. These pressure values can then be communicated to an air speed processor, as will be described in detail later with reference to FIGS. 4 and 6.

Miniaturized capacitive sensors, such as MEMS-based sensors, have one potential problem, that is, parasitic effects such as environmental noise, parasitic capacitance and leakage resistance. These effects are much less pronounced for piezoresistive devices. These parasitic effects are inherently related to miniaturization in the case of a capacitive device. Downscaling of the sensor dimensions implies downscaling of the active capacitance values to a few femtofarads. Hence, high output impedance and noise sensitivity cannot be avoided and the effects of stray capacitance becomes more dominant. Thus, signal conditioning must be done in close proximity to the pressure sensor, i.e., within the sensor package itself.

2. Conformal Surface Structure with Air Channels

Figure 5:
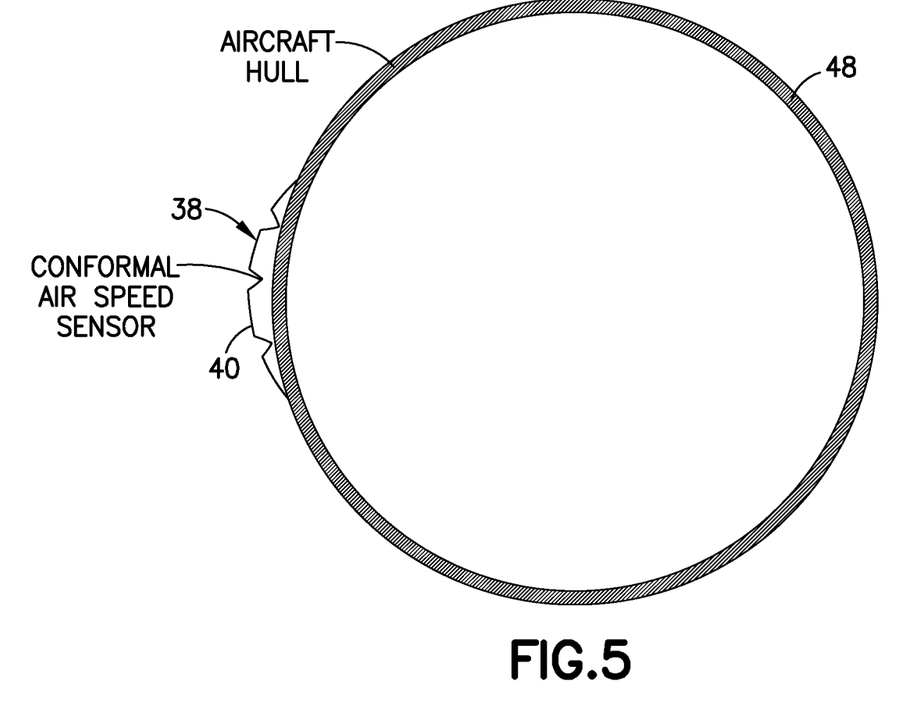
FIG. 5 is a diagram representing a sectional view of a hull (i.e., fuselage) of an aircraft having a MEMS-based conformal air speed sensor mounted on an exterior surface thereof.

The conformal air speed sensors in accordance with the embodiments disclosed herein further comprise a partially flexible conformal surface structure with air channels and holes for MEMS capacitive differential pressure sensor input as well as static air intake. The conformal surface 40 is made of a flexible material, such a metal or a plastic. As depicted in FIG. 5, the flexible conformal surface 40 of the conformal air speed sensor 38 (with multiple air channels) can be positioned on the curved surface 48 of an airplane fuselage (i.e., hull) with the air channels positioned so that the air stream flows parallel to the air channel direction to ensure correct measurement of air speed. The flexibility of the conformal surface 40 allows the conformal air speed sensor 38 to conform to the contour of the exterior surface 48 of the aircraft fuselage. When the air flows as a result of motion through the air by the airplane, some air flows through each air channel. This air then is subject to the design of the air channel, which can be designed to transform the air velocity (and hence the air pressure) into a pressure within the measurement range of the MEMS capacitive pressure sensor in that air channel.

Figure 3A:
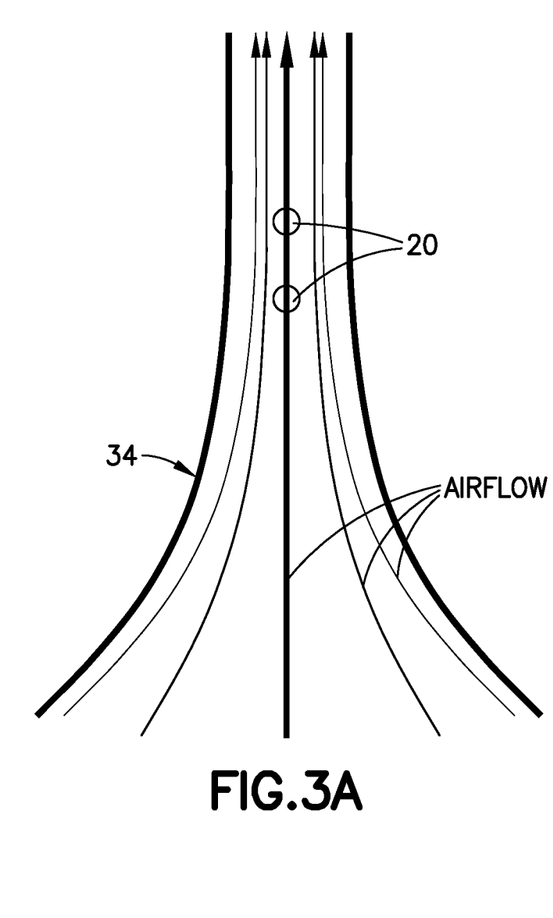
FIG. 3A is a diagram representing a top view of a portion of an air channel with placed MEMS pressure sensors in accordance with one embodiment. The arrows represent airflow through the channel, with thicker arrows representing higher air velocity.

FIG. 3A shows a top view of a portion of an air channel 34 with a pair of placed MEMS capacitive differential pressure sensors 20 in accordance with one embodiment. (In the alternative, one pressure sensor or more than two pressure sensors can be placed in each air channel.) The arrows in FIG. 3A represent airflow through the air channel 34, with thicker arrows representing higher air velocity. The air velocity decreases parabolically with increasing distance from the center of the air channel 34 to zero. The MEMS capacitive differential pressure sensors 20 are positioned so that the maximum differential pressure falls within the sensor range but with minimal turbulence.

Figure 3B:
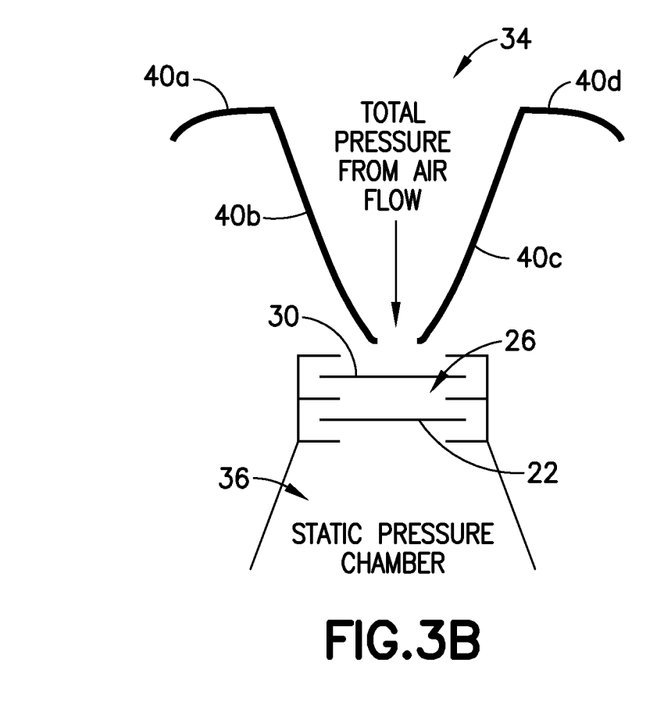
FIG. 3B is a diagram representing a sectional view of the air channel partly depicted in FIG. 3A, the section line being taken through the center of one of the MEMS pressure sensors.

FIG. 3B represents a sectional view of the air channel 34 depicted in FIG. 3A, the section line being taken through the center of a MEMS capacitive differential pressure sensor 20. The air channel 34 is formed in the conformal surface. Portions 40a through 40d of a conformal surface are shown in FIG. 3B, wherein exterior portions 40a and 40d form part of the exterior of the conformal surface, and air channel wall portions 40b and 40c form a pair of walls of the channel 34. In this example, the air channel 34 is designed with air channel wall portions 40b and 40c that restrict the air flow in a designed manner such that when the width of the air channel 34 is decreased, the air velocity increases and hence the air pressure decreases at certain designed locations. This is used to match the pressure range of the selected MEMS pressure sensor (in this case the MEMS sensor range is less than the total pressure minus static pressure at the highest air speed being designed for). The air channels can even use multiple reduction stages as well as other shape manipulations such as small ridges or dimples that not only reduce air flow velocity, but also reduce or change air turbulence to help with consistent air pressure measurement.

In FIG. 3B, a MEMS capacitive differential pressure sensor is indicated symbolically by a pair of horizontal lines respectively representing the diaphragm membrane 30 (with top electrode 32 not shown) and the silicon substrate 22 (with bottom electrode 28 not shown). As seen in FIG. 3B, the air channel 34 is occupied by air flow having a total pressure, which air flow is in fluid communication with a space above the diaphragm membrane 30. The cavity 26 between diaphragm membrane 30 and silicon substrate 22 is in fluid communication with a respective static pressure chamber 36.

Figure 5A:
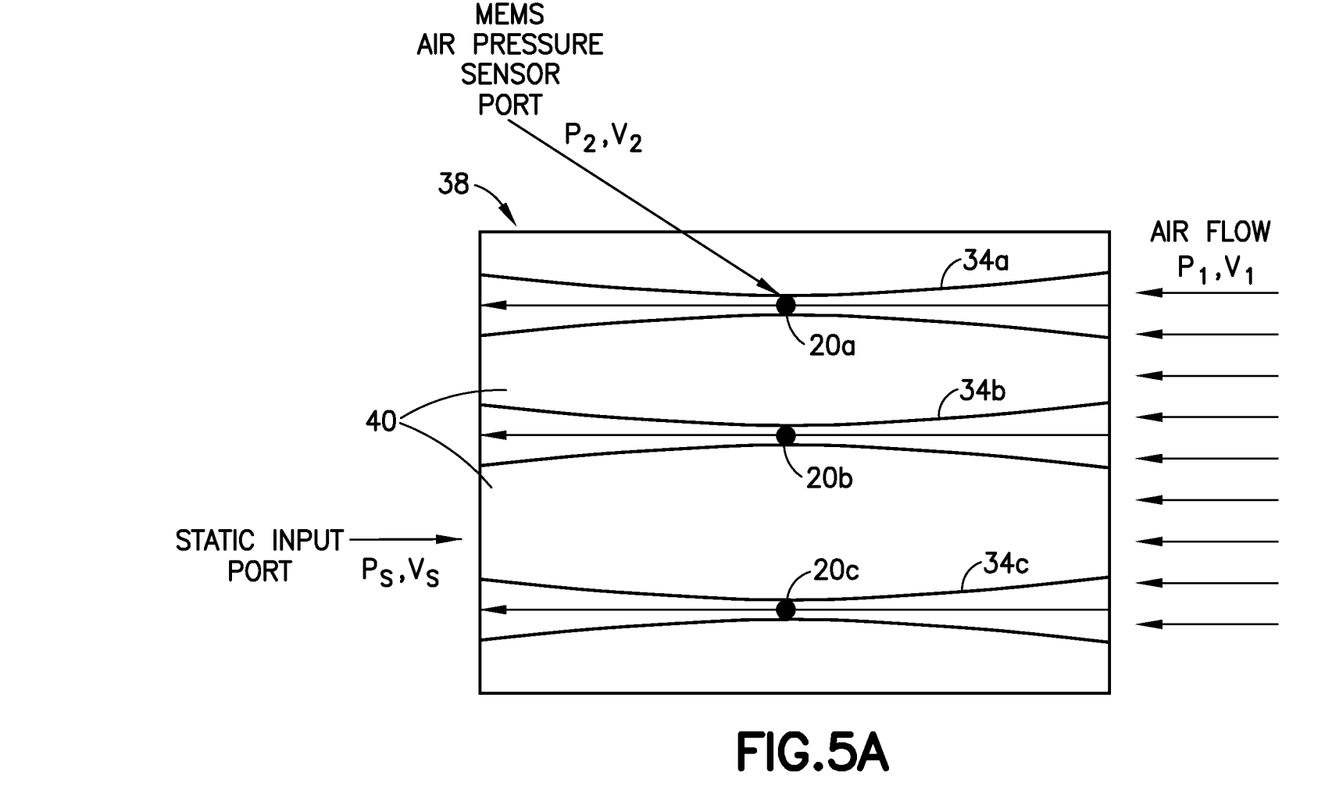
FIG. 5A is a diagram representing a top view of the MEMS-based conformal air speed sensor mounted on the exterior surface of the aircraft hull depicted in FIG. 5.

FIG. 5A is a diagram representing a top view of a MEMS-based conformal air speed sensor 38 comprising a conformal surface 40 having three air channels 34a-34c. During flight of the aircraft to which the air speed sensor is mounted, air flow at a pressure $P_1$ and a velocity $V_1$ enters the air channels at the forward end of the air speed sensor 38, as indicated by a set of parallel arrows on the right-hand side of FIG. 5A. Each of the air channels 34a-34c has a constriction. A respective port is provided in the bottom of each air channel at the respective constriction. Respective MEMS air pressure sensors 20a-20c are installed below these ports. In the constricted portion of an air channel, the air flow will have a pressure $P_2$ (less than $P_1$) and a velocity $V_2$ (greater than $V_1$). The air speed sensor 38 further comprises one or more static input ports (not visible in FIG. 5A) at the back end of the air speed sensor. These static input ports are in fluid communication with the static pressure chambers 36a-36c shown in FIG. 6. The ambient air entering the static input ports has a pressure $P_S$ and a velocity $V_S$.

Figure 5B:
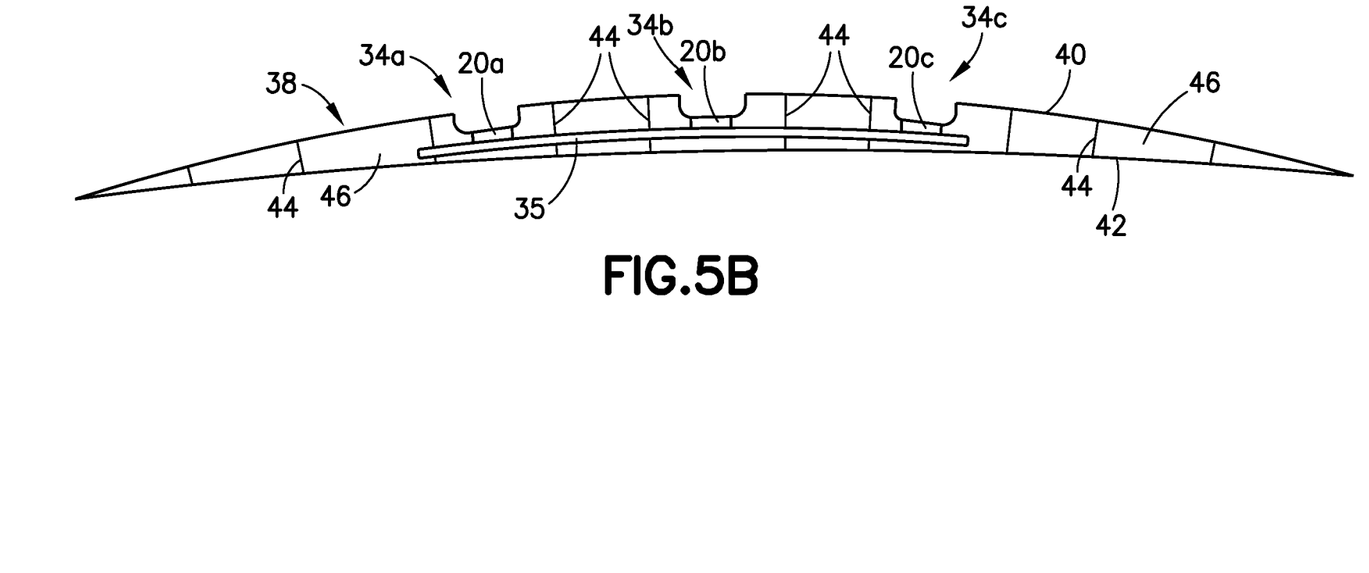
FIG. 5B is a diagram representing a sectional view of the MEMS-based conformal air speed sensor having a conformal surface made of plastic material, the section being taken through a plurality of MEMS pressure sensors installed under respective air channels.

FIG. 5B is a diagram representing a sectional view of the MEMS-based conformal air speed sensor 38 depicted in FIG. 5A, the section being taken through the MEMS pressure sensors 20a-20c which lie below respective air channels 34a-34c. In the embodiment depicted in FIG. 5B, the conformal air speed sensor 38 comprises a conformal surface 40 and a backside surface 42 connected by a multiplicity of interior ribs 44, which structures are made of flexible plastic material. The interior spaces of the conformal air speed sensor 38 depicted in FIG. 5B may be filled with thermal gel 46 for heating purposes, as explained in detail below. The conformal air speed sensor 38 is tapered on both sides and at the leading and trailing edges thereof. The MEMS pressure sensors 20a-20c shown in FIG. 5B are in fluid communication with a static pressure channel 35, which may in turn be in fluid communication with a plurality of static pressure chambers (not shown in FIG. 5B) similar in structure to static pressure chambers 36a-36c shown in FIG. 6.

Figure 6:
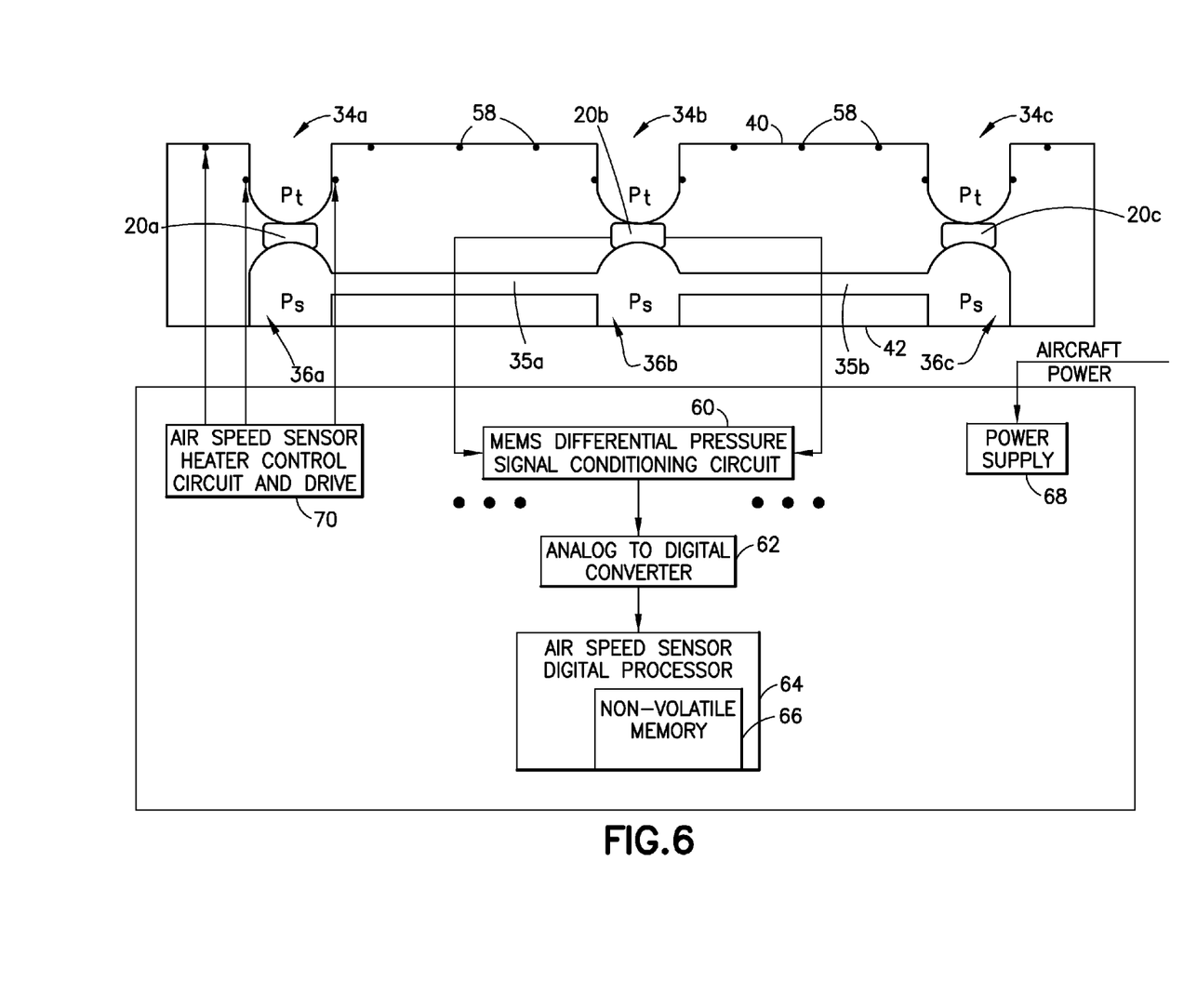
FIG. 6 is a diagram showing components of a conformal air speed sensor having a conformal surface made of metal in accordance with an alternative embodiment. The upper portion of FIG. 6 represents a sectional view (not drawn to scale; exaggerated in depth) of a conformal surface equipped with a plurality of MEMS pressure sensors (not showing curved tapered shape as mounted), while the lower portion of FIG. 6 is a block diagram showing associated electrical components.

FIG. 6 depicts components of a conformal air speed sensor having a conformal surface made of metal in accordance with an alternative embodiment. The upper portion of FIG. 6 represents a sectional view (not drawn to scale; exaggerated in depth) of a conformal surface equipped with a plurality of MEMS pressure sensors 20a-20c (not showing curved tapered shape as mounted), while the lower portion of FIG. 6 is a block diagram showing associated electrical components. In the embodiment depicted in FIG. 6, the conformal surface 40 and the backside surface 42 (as well as a plurality of interior ribs not shown) are made of a flexible metal. (As used herein, the term "metals" includes pure metals and metal alloys.) The conformal surface 40 is formed with three air channels 34a-34c. In FIG. 6, the section is taken in a plane that passes through the plurality of MEMS pressure sensors 20a-20c in the constricted regions of the respective air channels 34a-34c. The conformal air speed sensor depicted in FIG. 6 further comprises a plurality of static pressure chambers 36a-36c disposed underneath respective MEMS pressure sensors 20a-20c. The static pressure chambers 36a-36c are in fluid communication with each other via static pressure channels 35a and 35b. A multiplicity of resistive heating wires 58 are attached to the metallic conformal surface 40 for heating purposes, as described in detail below.

3. Air Speed Estimation Processor

As depicted in FIG. 6, the analog signals from each of the MEMS differential pressure sensors 20a-20c are conditioned by a respective MEMS differential pressure signal conditioning circuit 60. The conditioned analog signals are then converted into digital signals by an analog-to-digital converter 62. The system further comprises an air speed sensor digital processor 64 that processes the digital signals. This digital processing includes determining the changes in capacitance of the plurality of MEMS differential pressure sensors 20a-20c and computing a final air speed estimate. Calibration coefficients, such as offset and gain, are stored in non-volatile memory 66, which calibration coefficients are used by the air speed sensor digital processor 64 to very accurately report a measured pressure which has been fully compensated for external factors. The electronic circuitry depicted in FIG. 6 is powered by an electrical power supply 68, which in turn receives electrical power from the aircraft.

Figure 4:
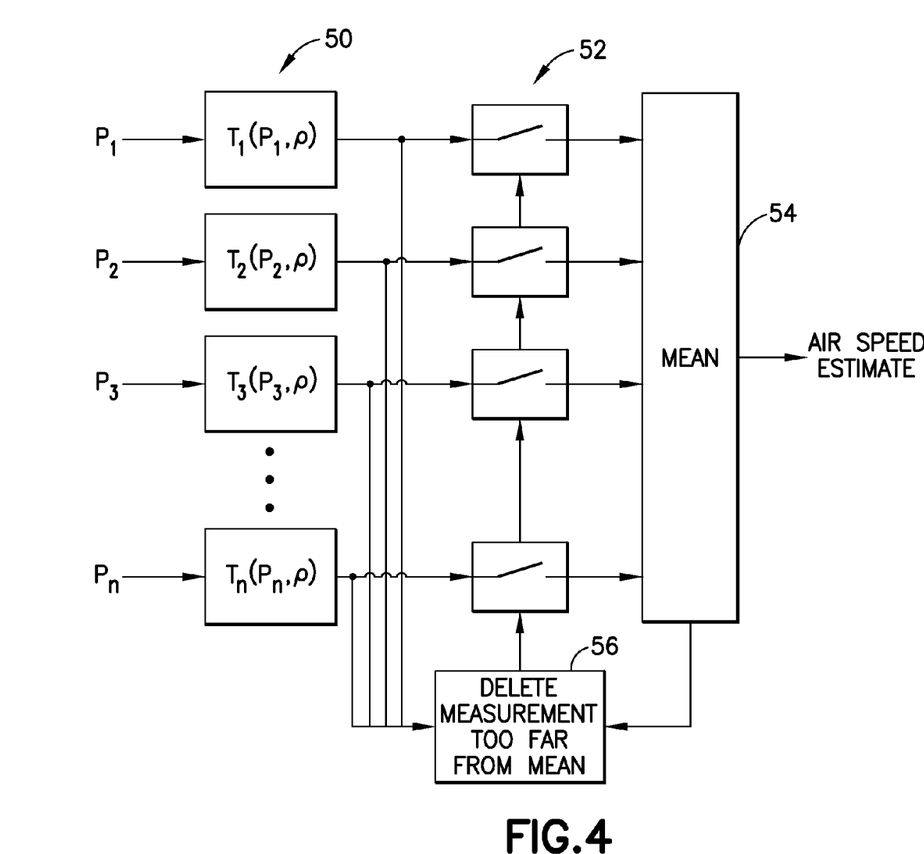
FIG. 4 is a block diagram showing operations of a redundant air speed estimation process in accordance with one embodiment.

FIG. 4 is a block diagram showing the redundant air speed processing. The air speed sensor digital processor takes the corrected differential air pressure measurements $P_1$ through $P_n$ (either in analog or digital form) from the array of n MEMS sensors and produces a single air speed estimate. To make an accurate estimate requires closely coupling the air speed calculation with a computational fluid dynamics (CFD) simulation that produces the pressure field at the location of each MEMS sensor under specific air flow conditions. The process is as follows:

1. Design the air channel shape to achieve the desired pressure reduction ratio.
2. Develop a CFD simulation (typically using either Navier-Stokes equations or the lattice-Boltzmann method) of the air channel that produces pressure field estimates across the air channel.
3. Generate air flow at a number of representative velocities and estimate simulated pressure fields at the MEMS pressure sensor locations.
4. Design a mathematical transform $T_k(P_k,\rho)$ that takes differential pressure measurements $P_K$ at position k and air density $\rho$ (which can be estimated in various ways, including using the pressure measurements $P_s$ and temperature measurements $T_s$ at the static port), and produces air speed estimates from the CFD simulation model.
5. Perform a calibration step with measured air speed on the actual air channel mounted on an aircraft or aircraft structure in a wind tunnel.
6. Modify the mathematical transform $T_k(P_k,\rho)$ to account for measured performance.

The air speed sensor digital processor then implements these transforms on the differential pressure measurements from MEMS pressure sensor by throwing out outliers to produce a more accurate mean value of the final air speed estimate. The details are shown in the block diagram of FIG. 4. The air speed sensor digital processor receives the differential pressure measurements $P_1$ through $P_n$ from the first through n-th MEMS pressure sensors and applies the transforms in step 50 to produce respective air speed estimates. These air speed estimates are output to switches 52 and, if those switches are open, received and processed by a software module 54 that computes the mean of the respective air speed estimates for each set during successive intervals of time. The resulting mean values are output as successive air speed estimates over time. The state of the switches 52 is controlled by a switch control circuit 56 that is configured to delete air speed estimates which are too far from the previous mean air speed estimate, thereby filtering out outlier values.

4. Thermal Transfer with Heating Elements

To prevent build-up of ice on the externally mounted conformal air speed sensors disclosed herein, the conformal surface can be heated. Since the conformal surface structure is flexible to accommodate mounting on aircraft with varying external curvature on its surfaces, the surface heating should not interfere with that flexibility. The following two options may be employed:

(1) As depicted in FIG. 6, a resistive heater may be provided which comprises a multiplicity of wires 58 attached to the underside of the exterior portions of the conformal surface and/or adjacent to the air channel wall portions of the conformal surface. This is appropriate if the conformal surface 40 is made of metal or some other thermally conductive material. Heating of the wires 58 is controlled by an air speed sensor heater control circuit and drive circuit 70. The control circuit is responsible for turning the heating circuit on or off, tracking the temperature and sending out heater status to the controlling computer; the drive circuit is a high-ampere circuit that delivers electricity directly to the heating wires 58.

(2) Referring now to FIG. 5B, a heating element (not shown in FIG. 5B) may be provided within a thermally conductive gel 46 that fills the spaces between the conformal surface 40 and backside surface 42 (except for cavities within which the static pressure resides). This is appropriate for non-thermally conductive conformal surfaces such as those made from plastics.

Design Calculations

Bernoulli's equation in the form used for Pitot tube calculations states that $$\frac{\rho}{2}V^2 = P_{total} - P_{static}$$

where $\rho$ is the air density at a given altitude, V is the air flow speed at a given point on a streamline, $P_{static}$ is the static air pressure of the aircraft under the particular atmospheric weather conditions, and $P_{total}$ is the total air pressure experienced as a result of the air flow caused by the motion of the aircraft. As a result of the squared velocity factor, the total air pressure can be significantly higher than the static atmospheric pressure when an aircraft is traveling at 600 mph or 269 meters per second (m/sec), as is quite typical during most of an airliner's cruise phase.

Figure 7:
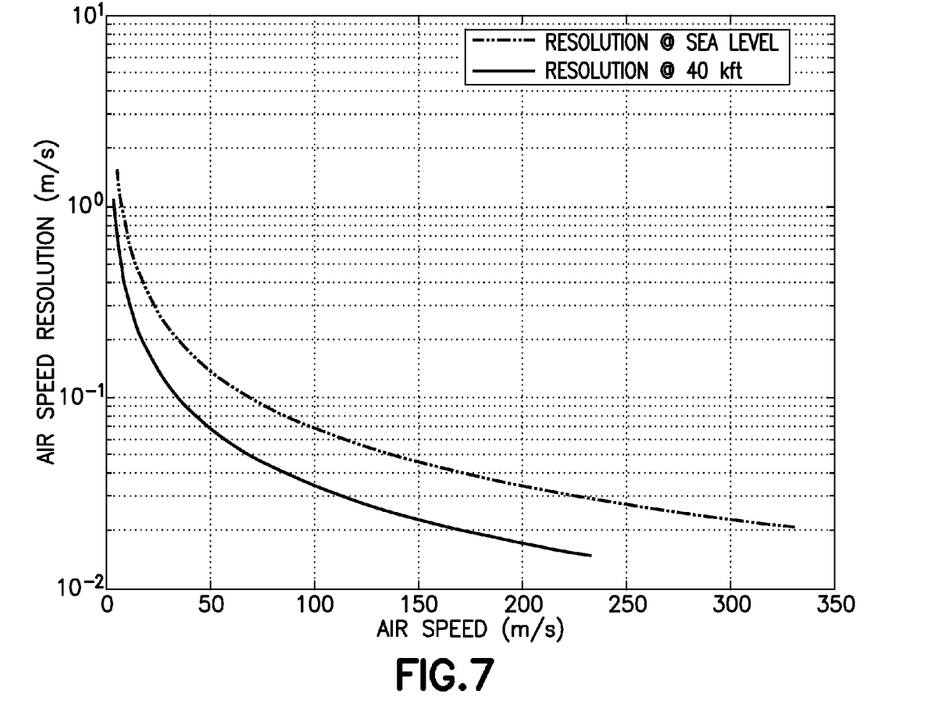
FIG. 7 is a graph showing MEMS theoretical air speed resolution versus air speed at sea level (- • • -) and at 40 kft (———).

Suppose that the MEMS pressure sensor has a pressure range 0 to R kPa. Here R=0.5 Torr or 3.25 kPa for some very sensitive sensors with a five decades resolution or R=7 kPa with a 4000× resolution. Using the 7 kPa range with an air speed range of 0 to 300 m/sec with a 4000× resolution, the result is the air speed resolution estimate (as a function of air speed) shown in FIG. 7. Here the air channel design must reduce the total pressure by a factor of 3× at 300 m/sec to place the total pressure within the range of the pressure sensor.

Principle of Operation

The principle of operation of the devices disclosed herein is a modification of the Venturi effect for measuring flow in liquids and gases. The Venturi effect is based on using a "funnel" to constrain the flow of fluid. As the cross-sectional area of a funnel-shaped air channel decreases, the velocity of the fluid increases and the pressure correspondingly decreases. This is because, according to the laws governing fluid dynamics, a fluid's velocity must increase as it passes through a constriction to satisfy the principle of continuity. Conversely, its pressure must decrease to satisfy the principle of conservation of mechanical energy. Thus any gain of the fluid's kinetic energy due to its increased velocity through a constriction is negated by a drop in its pressure. This principle is used to create Venturi meters to measure volumetric flow rate. This effect is modified by only having a partially constrained flow as shown in FIGS. 3A and 5A, so that this effect is reduced, but still present.

Specifically a near conformal shape should be designed with air channels formed in the conformal surface to constrain the air flow transverse to the conformal surface, but not perpendicular to the conformal surface. This "open-air Venturi surface" has been studied in other contexts, such as with constrained building configurations. By designing a near-conformal air speed sensor surface with restrictive channel shapes as shown in FIGS. 3A and 5A, one can increase the air velocity amplification factor K to a designated value. This may be done using one or more designed channel restrictions in series. By increasing the air flow rate, the pressure can be decreased by the same factor. Thus one can achieve (for example) the 3× reduction mentioned in the example disclosed above. From measurements within the air channels, a final air speed velocity can be estimated. This is explained mathematically below.

Using the notation in FIG. 5A for air flow velocities and pressures, Bernoulli's principle states that $$P_1 - P_2 = \frac{\rho}{2}(V_2^2 - V_1^2)$$

Thus the desired air speed $V_1$ is related to the higher constrained velocity $V_2$ and their inversely related pressures, along with the atmospheric density $\rho$. Now $\rho$ can either be estimated using other altitude and temperature measurements or measured directly using the pressure $P_s$ and temperature $T_s$ at the static air port and the ideal gas law relationship $$\frac{P_s}{R_{air}T_s} = \rho$$

where $R_{air}$ is the specific gas constant for air. Also, $P_2$ and $P_s$ are related via Bernoulli's principle as $$P_2 - P_s = \frac{\rho}{2}(V_2^2)$$

Thus one can find $V_2$ as $$V_2 = \sqrt{\frac{P_2 - P_s}{\rho/2}}$$

By designing a velocity amplification factor into the air speed sensor surface channel of $K=V_2/V_1$, the final estimate for $V_1$ is obtained.

These calculations are for ideal incompressible gases. To account for the additional non-linear effects of both the CFD simulation results and compression as well as real world effects of turbulence, the simple linear relationship defined by a constant K can be replaced with the transform $T_k(P_k,\rho)$ at each sensor location.

In summary, the concept of a MEMS-based conformal air speed sensor has been disclosed to address the icing and blockage problems inherent in standard Pitot tube air speed sensors. This MEMS-based conformal air speed sensor channels air flow over its channeled surface and measures relative air pressure between the air flowing in the channel and the static pressure under the channel to estimate the air speed of an aircraft. The conformal surface structure is made of flexible material and can be attached to the side or bottom of an aircraft as an adjunct or main air speed sensor.

While air speed sensors have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the operations recited therein be performed in alphabetical order (alphabetical ordering in the claims is used solely for the purpose of referencing previously recited operations) or in the order in which they are recited. Nor should they be construed to exclude two or more operations being performed concurrently or alternatingly.

The invention claimed is:

1. An apparatus comprising:
   a flexible structure having an exterior surface with a first open air channel having a bottom with first port; and
   a first pressure sensor installed in said flexible structure in a position underneath and in fluid communication with said first port.

2. The apparatus as recited in claim 1, wherein said flexible structure comprises a static pressure input and a static pressure chamber in fluid communication with said static pressure input, said first pressure sensor being in fluid communication with said static pressure chamber.

3. The apparatus as recited in claim 1, wherein said first pressure sensor is a capacitive differential pressure sensor comprising a microelectromechanical system.

4. The apparatus as recited in claim 1, wherein said first pressure sensor comprises a deformable diaphragm membrane having a first electrode formed thereon and a substrate having a second electrode formed thereon, said first and second electrodes being separated by a distance which is a function of a deflection of said deformable diaphragm membrane.

5. The apparatus as recited in claim 1, wherein said first open air channel comprises a constricted portion, said first port being disposed at a bottom of said constricted portion of said first open air channel.

6. The apparatus as recited in claim 1, wherein said exterior surface of said flexible structure has a second open air channel having a bottom with a second port, said apparatus further comprising a second pressure sensor installed in said flexible structure in a position underneath and in fluid communication with said second port.

7. The apparatus as recited in claim 6, further comprising:
   a first signal conditioning circuit connected to condition an analog signal output by said first pressure sensor;
   a first analog-to-digital converter connected to convert a conditioned analog signal output by said first signal conditioning circuit into a first digital signal;
   a second signal conditioning circuit connected to condition an analog signal output by said second pressure sensor;
   a second analog-to-digital converter connected to convert a conditioned analog signal output by said second signal conditioning circuit into a second digital signal; and
   a processor programmed to calculate an air speed estimate taking into account said first and second digital signals.

8. The apparatus as recited in claim 1, further comprising a heating element which is thermally coupled to said exterior surface of said flexible structure.

9. The apparatus as recited in claim 8, further comprising thermally conductive gel by which said heating element is thermally coupled to said exterior surface of said flexible structure.

10. The apparatus as recited in claim 1, wherein said exterior surface of said flexible structure is made of metal or plastic.

11. A system comprising an airplane having an exterior surface and a conformal air speed sensor attached to said exterior surface of said airplane, wherein said conformal air speed sensor comprises:
    a flexible structure having an exterior surface with a first and second open air channels formed therein;
    a first capacitive differential pressure sensor installed in said flexible structure in a position underneath and in fluid communication said first open air channel;

a second capacitive differential pressure sensor installed in said flexible structure in a position underneath and in fluid communication said second open air channel; and electronic circuitry which is programmed or configured to estimate an air speed of said aircraft based at least in part on signals output by said first and second capacitive differential pressure sensors.

12. The system as recited in claim 11, wherein said flexible structure comprises a static pressure input and first and second static pressure chambers in fluid communication with said static pressure input, said first pressure sensor being disposed between said first open air channel and said first static pressure chamber, and said second pressure sensor being disposed between said second open air channel and said second static pressure chamber.

13. The system as recited in claim 11, wherein each of said first and second capacitive differential pressure sensors comprises a deformable diaphragm membrane having a first electrode formed thereon and a substrate having a second electrode formed thereon, said first and second electrodes being separated by a distance which is a function of a deflection of said deformable diaphragm membrane.

14. The system as recited in claim 11, wherein each of said first and second open air channels comprises a respective constricted portion, said first capacitive differential pressure sensor being disposed underneath said constricted portion of said first open air channel and said second capacitive differential pressure sensor being disposed underneath said constricted portion of said second open air channel.

15. The system as recited in claim 11, wherein said electronic circuitry comprises:
a first signal conditioning circuit connected to condition an analog signal output by said first capacitive differential pressure sensor;
a first analog-to-digital converter connected to convert a conditioned analog signal output by said first signal conditioning circuit into a first digital signal;
a second signal conditioning circuit connected to condition an analog signal output by said second capacitive differential pressure sensor;
a second analog-to-digital converter connected to convert a conditioned analog signal output by said second signal conditioning circuit into a second digital signal; and
a processor programmed to calculate an air speed estimate taking into account said first and second digital signals.

16. The system as recited in claim 11, further comprising a heating element which is thermally coupled to said exterior surface of said flexible structure.

17. The system as recited in claim 16, further comprising thermally conductive gel by which said heating element is thermally coupled to said exterior surface of said flexible structure.

18. The system as recited in claim 11, wherein said exterior surface of said flexible structure is made of metal or plastic.

19. A method of estimating a speed of a craft that is operable to move through a fluid medium, the method comprising:
attaching a flexible structure on an exterior surface of the craft, the flexible structure having an exterior surface with one or more open air channels formed therein;
transmitting signals from one or more differential pressure sensors installed underneath constricted portions of the one or more open air channels; and
calculating the speed of the craft relative to a surrounding fluid medium during movement of the craft, which speed calculation is based on a density of the fluid medium and the signals transmitted by the one or more differential pressure sensors.

20. The method as recited in claim 19, wherein each signal transmitted by each differential pressure sensor represents a difference between a static pressure underneath a respective open air channel and a total pressure in the same open air channel.

21. The method as recited in claim 19, further comprising conditioning analog signals transmitted by the differential pressure sensors and converting those analog signals to digital signals.

22. The method as recited in claim 21, wherein the calculating step comprises:
transforming said digital values into respective speed estimates based in part on the density of the fluid medium;
calculating a mean speed estimate based on those speed estimates; and
filtering out subsequent speed estimates which differ from said mean speed estimate by more than a specified threshold.

23. The method as recited in claim 19, wherein the fluid medium is air and the craft is an aircraft.

* * * * *